(12) United States Patent
Cizeron et al.

(10) Patent No.: US 9,114,847 B2
(45) Date of Patent: Aug. 25, 2015

(54) CLIPLESS CYCLE PEDAL DEVICE

(75) Inventors: Damien Cizeron, Chevrieres (FR); Julien Bouchez, Saint Germain des Pres (FR)

(73) Assignee: LOOK CYCLE INTERNATIONAL, Nevers (FR)

( * ) Notice: Subject to any disclaimer, the term of this patent is extended or adjusted under 35 U.S.C. 154(b) by 133 days.

(21) Appl. No.: 13/368,624

(22) Filed: Feb. 8, 2012

(65) Prior Publication Data

US 2012/0204673 A1 Aug. 16, 2012

(30) Foreign Application Priority Data

Feb. 14, 2011 (FR) ...................................... 11 51158

(51) Int. Cl.
*B62M 3/08* (2006.01)
(52) U.S. Cl.
CPC ............. *B62M 3/086* (2013.01); *Y10T 74/2168* (2015.01)
(58) Field of Classification Search
CPC .................................................... B62M 3/086
USPC ................................ 74/594.4, 594.6; 36/131
See application file for complete search history.

(56) References Cited

U.S. PATENT DOCUMENTS

| | | | |
|---|---|---|---|
| 4,840,086 A | | 6/1989 | Bidal |
| 4,942,778 A | * | 7/1990 | Bryne ........................... 74/594.6 |
| 5,423,233 A | | 6/1995 | Peyre et al. |
| 5,575,184 A | * | 11/1996 | De Schrijver ................ 74/594.6 |
| 5,787,764 A | * | 8/1998 | Peyre ............................ 74/594.6 |
| 6,205,885 B1 | | 3/2001 | Hermansen et al. |
| 6,305,244 B1 | * | 10/2001 | Takahama .................... 74/594.6 |
| 6,324,941 B1 | | 12/2001 | Ho |
| 6,640,663 B1 | * | 11/2003 | Steinberg ..................... 74/594.6 |
| 7,877,904 B2 | * | 2/2011 | Bryne .............................. 36/131 |
| 2003/0066385 A1 | | 4/2003 | Blanchette et al. |
| 2005/0087036 A1 | | 4/2005 | Couturet et al. |
| 2007/0137431 A1 | | 6/2007 | Couturet et al. |
| 2009/0031850 A1 | * | 2/2009 | Hillairet et al. .............. 74/594.6 |

FOREIGN PATENT DOCUMENTS

| | | | | |
|---|---|---|---|---|
| DE | 3724578 A1 | * | 1/1988 | .............. B62M 3/08 |
| EP | 0 296 898 A1 | | 12/1988 | |
| EP | 0 557 735 A1 | | 9/1993 | |
| EP | 1 338 501 A1 | | 8/2003 | |
| EP | 1533220 A1 | * | 5/2005 | .............. B62M 3/08 |
| EP | 1 780 113 A1 | | 5/2007 | |
| EP | 2 487 098 A1 | * | 8/2012 | .............. B62M 3/08 |
| FR | 2 442 175 A1 | | 6/1980 | |
| FR | 2 793 763 | * | 11/2000 | .............. B62M 3/08 |

(Continued)

OTHER PUBLICATIONS

English Abstract of DE 3724578 A1, Hadwich, Jan. 1988.*
Torsion (mechanics), wikipedia.org, Feb. 6, 2015.*
Torsional stress—Google Search, google.com, Feb. 6, 2015.*

(Continued)

*Primary Examiner* — Vinh Luong
(74) *Attorney, Agent, or Firm* — Young & Thompson

(57) ABSTRACT

A clipless pedal device (1) for securing a first securing arrangement provided on the pedal with a second securing arrangement fixed under the sole of the cycling shoe, includes an attachment arrangement (8). The attachment arrangement (8) includes at least one moving part that is prestressed into the attachment position by an elastic element (5a, 5b). The elastic element (5a, 5b) includes a straight oblong part constituting a torsionally (T) stressed element.

9 Claims, 2 Drawing Sheets

(56) References Cited

FOREIGN PATENT DOCUMENTS

FR 2 861 362 A1 4/2005
WO 2005/016736 A2 2/2005

OTHER PUBLICATIONS

French Search Report, dated Aug. 12, 2011, from corresponding French application.

* cited by examiner

CLIPLESS CYCLE PEDAL DEVICE

BACKGROUND OF THE INVENTION

The present invention relates to a clipless pedal device with an attachment arrangement for securing a first securing arrangement provided on the pedal with a second securing arrangement fixed under the sole of the cycling shoe.

Many clipless pedal attachment systems are known.

The single-sided attachment systems of patent FR 2 442 175 comprise a fixed attachment snout situated at the front of the pedal, and a moving claw situated at the rear of said pedal, this claw being returned by an elastic member into a position in which it locks a cleat fixed under the shoe.

Such a pedal is also known from publication WO2005/016736 which discloses the use of an elastic return member consisting of two helical springs that are compressed as the cleat is engaged or disengaged. Another example of an elastic return member that is stressed in compression is given in publication US2003/066385. This elastic member, which is housed in an attachment cleat, also comprises helical springs which are compressed by the action of pushing against a part that projects as the cleat is engaged.

More recently, with the advent of mountain biking (MTB), double-sided attachment clipless pedals have appeared, in which pedals the retaining means have two opposite attachment sides one on each side of the pedal body.

By using a double-sided attachment clipless pedal device, the cyclist does not have to find the side of the pedal that is provided with the cleat retaining means, can clip back in quickly and remain balanced while continuing to look straight ahead.

A double-sided attachment pedal is known from publication EP0557735. This pedal comprises an elastic return member consisting of a helical spring which, as a cleat is engaged on or disengaged from the pedal, is compressed and then relaxes to bring the moving claw back into its initial position. Another example of a double-sided attachment pedal comprising a compressively stressed elastic return member is given in U.S. Pat. No. 6,324,941. In that document, the elastic means consists of compression springs arranged on each side of the axis of the pedal.

Because of the mud involved in this kind of pursuit, and because of the trouble it causes in the operation of pedal attachment systems, steps have been taken to make this mud easier to remove, by hollowing out the pedal bodies as far as possible, and to improve attachment using members that are as slender as possible, particularly attachment members in the form of loops or bows made of metal wire.

U.S. Pat. No. 6,205,885 describes a clipless pedal provided with such bows, centered on the axis of the pedal, and with four sides for attaching the cleat to the pedal body, each attachment side being defined between a pivoting bow and a fixed bow.

Patent FR 2 861 362 describes a clipless pedal provided with such bows which are eccentric and arranged at the periphery of the pedal axis.

These bows or claws are most often returned to the locking position using springs made of metal wire under bending stress.

A clipless pedal, of reduced weight and with a low number of component parts, in which attachment is onto two bows which themselves act as bending springs, is described in patent EP 0296 898.

Another clipless pedal, of reduced weight with a low number of component parts, in which attachment is to bows which themselves act as bending springs, is described in patent EP 1 780 113. The attachment bows are all independent of one another. The ends of these attachment bows are offset from one another to create inset and to stress the bow in bending along bending axes that are offset from one another.

This kind of MTB clipless pedal is manufactured under the Quartz trade name by the company under French Law LOOK CYCLES and is presented on the website accessible via the link: http://www.lookcycle.com/quartz/ or is presented in video form on the website accessible via the link: http://www.youtube.com/watch?v=6brlmKvgydE&feature=related This pedal manufactured under the QUARTZ trade name may, however, suffer a risk of lack of rigidity of the steel wire that acts as the return spring and serves to attach the cleat to the pedal body. This risk of lack of rigidity may lead to unwanted unclippings.

This QUARTZ pedal may also suffer a risk of stress concentration in the steel wire that acts as the return spring and serves to attach the cleat to the pedal body, particularly in the cranked portions thereof. The steel wire that acts as the return spring and serves to attach the cleat to the pedal body ages more quickly in the regions of stress concentration and becomes less and less rigid.

SUMMARY OF THE INVENTION

It is an object of the invention to address these disadvantages by proposing a new, improved, clipless pedal device of this kind which is simple to manufacture and to assemble.

The subject of the invention is a clipless pedal device with an attachment arrangement for securing a first securing arrangement provided on the pedal with a second securing arrangement fixed under the sole of the cycling shoe, said attachment arrangement comprising at least one moving part which is prestressed into the attachment position by an elastic means, wherein the elastic means comprises at least one straight oblong part constituting a torsionally stressed element.

According to other alternative features of the invention, which are particularly advantageous for mountain biking:

The elastic means comprises a double cranked arrangement and at least one elongate straight part that constitutes said torsionally stressed element.

The elastic means has an S-shaped arrangement, the middle part thereof constituting said torsionally stressed element.

The elastic means may comprise two turned-back ends forming a pivot.

The elastic means preferably is made of wire bent at the ends and comprising a substantially straight torsionally stressed middle part.

The elastic means is mounted on and pressed against the body of the pedal by a lateral mounting means.

The body of the pedal bears a bearing plate for the attachment member or the retaining cleat fixed under the sole of the cycling shoe.

The pedal comprises two bent-wire arrangements each having two attachment ends, so as to form a double-sided attachment pedal.

According to other alternative features of the invention, which are particularly advantageous for on-road cycling:

The elastic means comprises a torsionally stressed bar mounted secured to the body of the pedal and to an attachment-claw-forming lever.

The torsion bar is set into the attachment-claw-forming lever or formed as an integral part of the attachment-claw-forming lever.

The torsion bar is set into the body of the pedal or formed as an integral part of the body of the pedal.

BRIEF DESCRIPTION OF THE DRAWINGS

The invention will be better understood from the following description given by way of nonlimiting example with reference to the attached drawings in which:

With reference to FIGS. 1 to 5, elements that are identical or functionally equivalent are identified by identical reference numerals.

DESCRIPTION OF PREFERRED EMBODIMENTS

Figure 1:
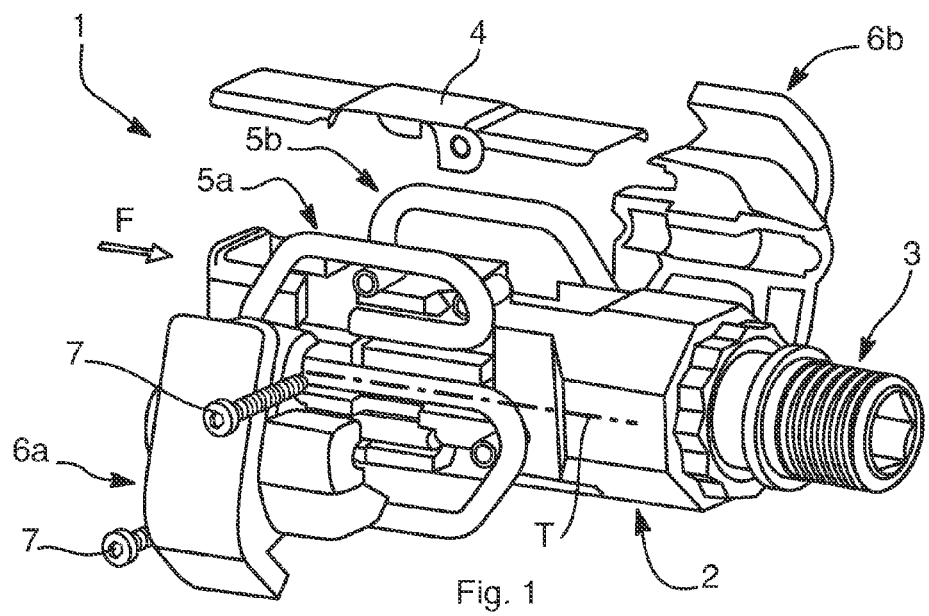
FIG. 1 schematically depicts an exploded perspective view of a first embodiment of a clipless pedal device according to the invention comprising two attachment sides.

In FIG. 1, a clipless pedal device (1) for mountain biking (MTB) comprises a pedal body (2) mounted so that it can rotate on a pedal spindle (3), in the known way, on two rolling bearings that have not been depicted in detail.

The pedal spindle (3) has a screw thread able to engage with a tapped hole in a crank arm, not depicted, of a bicycle crankset.

The pedal (1) comprises at least one bearing plate (4) for an attachment member or a retaining cleat fixed under the sole of the cycling shoe, not depicted.

This bearing plate (4) is mounted on the body (2) between two attachment arrangements (5a, 5b). The attachment arrangements (5a, 5b) are mounted on and pressed laterally against the body of the pedal by respective lateral deflectors (6a, 6b).

The deflectors (6a, 6b) are mounted using screws (7) or any other equivalent mechanical fastener.

Each elastic means (5a, 5b) is S-shaped with two turned-back ends forming a pivot in a corresponding housing of the pedal body (2).

Each elastic means (5a, 5b) is preferably made up of wires bent at the ends to constitute retaining arrangements.

Figures 2, 3:
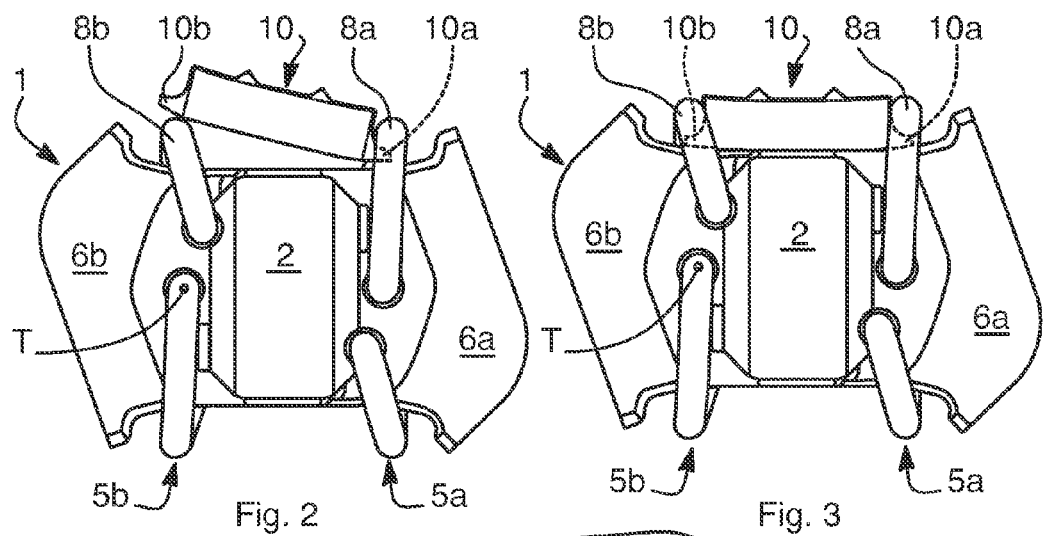
FIG. 2 is a schematic end-on view in the direction of the arrow F of FIG. 1, of the pedal device of FIG. 1 at the start of insertion of the retaining cleat.
FIG. 3 is a schematic end-on view in the direction of the arrow F of FIG. 1 of the pedal device of FIGS. 1 and 2, illustrating the attachment of the cleat.

FIG. 2 depicts a clipless pedal device according to the invention at the start of insertion of the retaining cleat (10), the retaining cleat (10) being intended to be fixed to a cycling shoe, not depicted.

A first snout (10a) of the retaining cleat (10) is engaged under an upper end (8a) of an elastic means (5a), while the second snout (10b) of the retaining cleat (10) is intended to be pressed downward to move aside an upper arrangement (8b) of the second elastic means (5b) so that the second snout (10b) can clip under this attachment end (8b) of the elastic means (5b).

The pressure of the snout (10b) of the retaining cleat (10) applies a force to the end (8b). This force is transmitted to the wire arrangement and leads to a torsional effect about the axis (T) on the middle part of the element constituting the elastic means (5b).

FIG. 3 shows the retaining cleat (10) in the position in which it is attached to the clipless pedal (1) according to the invention.

The snouts (10a, 10b) are engaged under the attachment ends (8a, 8b) of the elastic means (5a, 5b).

The effect of torsion about the axis (T) is transmitted to the attachment end (8b) and prevents the retaining cleat (10) from disengaging.

The clipless pedal depicted in FIGS. 1 to 3 is a two-sided clipless pedal that has two retaining sides because the elastic means (5a, 5b) have two active sides one on each side of the mid-plane of the clipless pedal (1).

Figure 4:
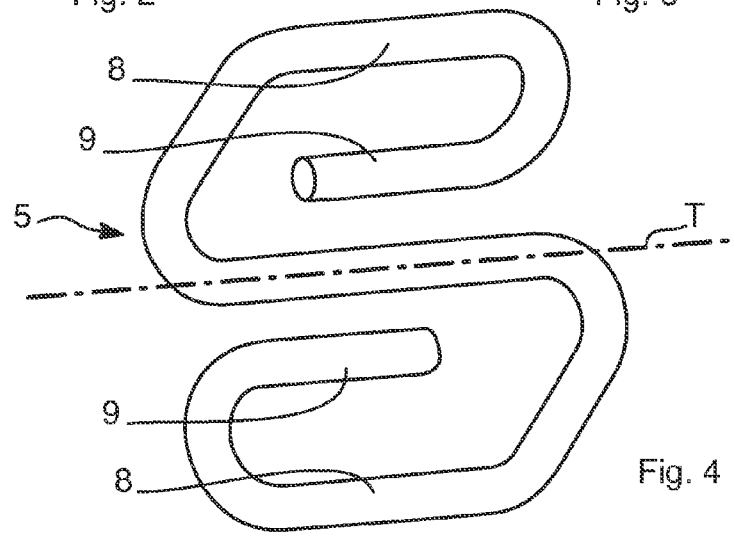
FIG. 4 is a schematic perspective view of a wire attachment arrangement that forms part of the pedal device of FIGS. 1 to 3.

In FIG. 4, an elastic means (5) comprises an attachment lower end (8) and an attachment upper end (8).

The attachment ends (8) are extended by pivot-forming ends (9) intended to be mounted in corresponding housings of the body (2) of a pedal that has not been depicted in full.

The middle part of the elastic means (5) constitutes a substantially elongate element in the form of a bar of axis (T). The axis (T) of the element (5) constitutes an elastic torsion axis allowing relative movement between the upper attachment end (8) and the attachment lower end (8) of the elastic means (5).

For preference, the plane defined by the torsion axis (T) and the upper end (8) for retaining a cleat form a dihedral angle with the plane defined by the torsion axis (T) and the lower end (8) for retaining the cleat under the pedal.

The turned-back ends (9) are preferably pivot-mounted on the body (2) of the pedal.

In the example depicted in FIGS. 1 to 5, the wire arrangements constituting an elastic means (5) are two in number, and their attachment ends (8) define a double-sided attachment pedal.

Each attachment side of the pedal corresponds to the catching upper ends (8) of the elastic means (5a, 5b) while the other attachment side corresponds to the lower ends (8) of the elastic means (5a, 5b).

The pivot-forming bent-back ends (9) allow the catching upper ends (8) of the elastic means (5a, 5b) to move through the application of a torsion force about the axis (T) of the elongate middle part directed along the axis of symmetry of the elastic means (5a or 5b).

Each elastic means (5, 5a, 5b) is made of a wire in an overall S-shape having a central part running substantially parallel to the pedal spindle (3).

This central part of axis (T) runs substantially parallel to the pedal spindle (3) and is connected by four cranked portions to the turned-back ends (9) forming a statically redundant pivot.

These turned-back ends (9) that form a statically redundant pivot are mounted in appropriate arrangements of the pedal body (2).

The pivot-forming ends (9) run parallel to the central torsion part along the axis (T) and also run substantially parallel to the axis of the pedal body (2).

The wire of each S-shape is preferably made of an elastic material, such as steel, but could also be made of an elastomer, a plastic, a fiber-reinforced plastic or the like, in order to use the inherent elasticity of the material of which it is made and allow torsion about the axis (T).

Figure 5:
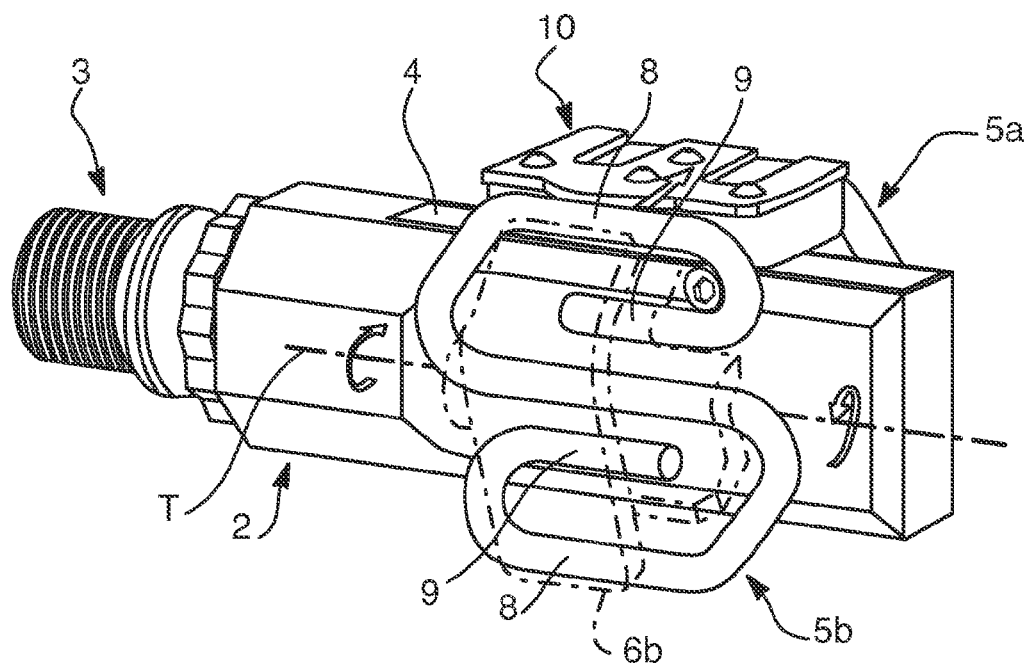
FIG. 5 schematically depicts a partial perspective view of the embodiment of the clipless pedal device according to the invention described with reference to FIGS. 1 to 4.

FIG. 5 shows the elastic means (5a, 5b) in position in relation to the pedal body (2).

The deflectors (6a, 6b) for mounting and pressing against the elastic means (5a, 5b) have been depicted in broken line for the sake of clarity.

A clipless pedal according to the invention and described with reference to FIGS. 1 to 5 comprises seven main component parts: the deflectors (6a, 6b) depicted in broken line, the pedal body (2), two bearing plates (4) and the elastic means (5a, 5b) described with reference to FIGS. 1 to 4.

When a catching part (8) is being moved aside by a cleat (10), the dihedral angle formed about the torsion axis (T) deforms, so as to form an open dihedron, thus applying opposing torsion along the axis (T).

After the retaining snouts of the cleat (10) have engaged under the catching ends (8), the dihedron formed about the axis (T) reverts to its initial position and holds the cleat (10) in position to secure the cycling shoe to the clipless pedal according to the invention.

On unclipping, a twisting of the retaining cleat (10) causes the catching ends (8) to part and allows the retaining cleat (10) to be released and the cycling shoe to be detached.

The entire S-shaped piece, shown for example in FIG. 4, also may be denoted an attachment piece or a shoe-attachment piece, there being first and second such attachment pieces shown in FIGS. 1-3 and 5. The portions 8 of these S-shaped pieces also may be denoted catching parts, there being first and second such catching parts for each S-shaped piece shown in FIGS. 1-5.

Figure 6:
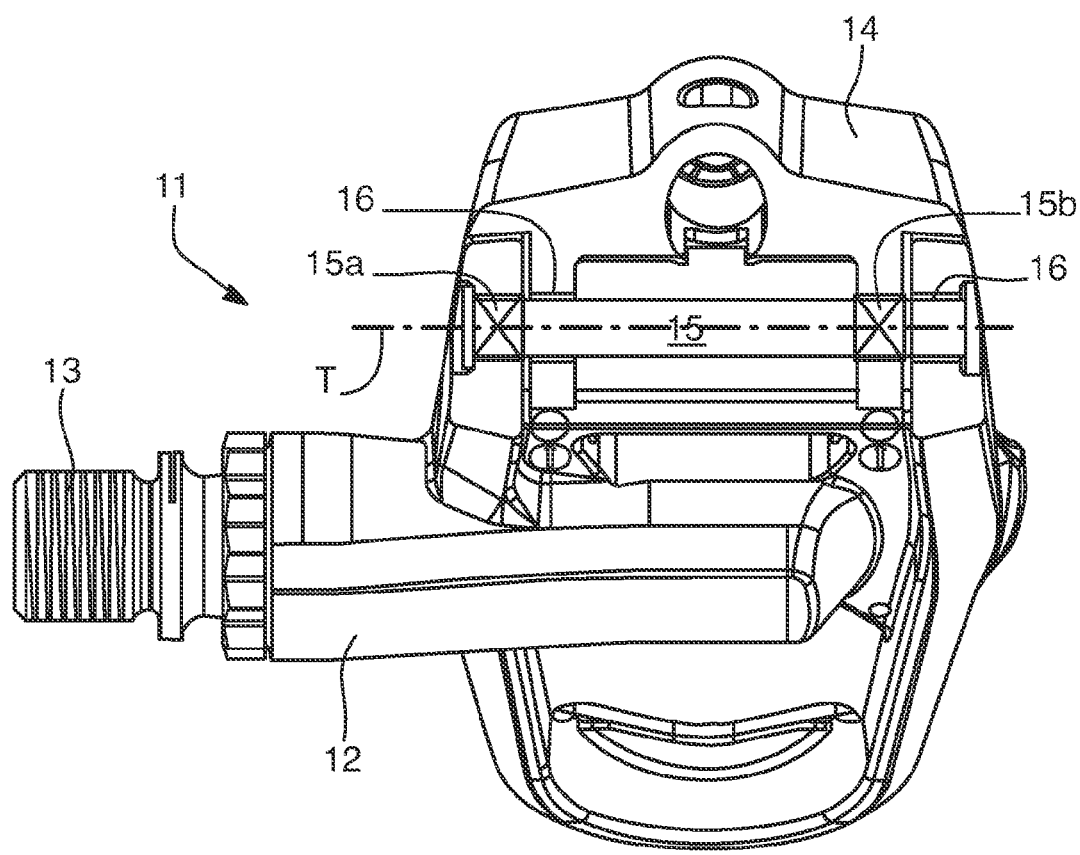
FIG. 6 schematically depicts a perspective view with part-section of a second embodiment of a clipless pedal device according to the invention, having just one attachment side.

FIG. 6 depicts a second embodiment of a clipless pedal device according to the invention which is particularly advantageous for on-road cycling.

In this embodiment, a clipless pedal device (11) for a road bicycle is depicted with its body (12) mounted to rotate on a pedal spindle (13) in a way known per se via rolling bearings that have not been depicted in detail.

The spindle (13) at one end comprises a screw thread able to engage with a tapped orifice on a bicycle crankset crank, not depicted.

The pedal body (12) bears a lever (14) forming a retaining or attachment claw for a retaining cleat that has not been depicted.

The retaining member (14) is mounted secured to an elastic means (15) comprising one straight oblong part forming a torsion bar torsionally stressed about an axis (T).

The elastic means (15) that forms a torsion bar twisting about the axis (T) is preferably mounted secured to the body (12) of the pedal and to the lever (14) that forms the attachment claw. The torsion bar (15) may be formed as an integral part of the lever (14) forming the attachment claw and/or may be formed as an integral part of the pedal body (12).

In the example depicted, the torsion bar (15) is inset in the lever (14) by means of an arrangement that prevents rotation, for example a square bar arrangement (15b).

According to an undepicted alternative form of the invention, the torsion bar (15) may be inset into the attachment claw (14) using adhesive bonding.

The torsion bar (15) is also inset into the body (12) of the pedal so as to prevent it from rotating at the point of insetting, for example by means of an arrangement that prevents rotation, for example a square bar arrangement (15a).

In the example depicted, the torsion bar (15) is inset into the body (12) of the clipless pedal according to the invention at the location (15a), and this torsion bar (15) is also inset into the attachment claw (14) at the location (15b).

The locations (16) correspond to a relative freedom of pivoting in the pedal body (12) and in the attachment claw (14).

Thus, when a retaining cleat causes the attachment claw (14) to rotate, torsion occurs between the inset ends (15a, 15b) in the opposite direction to the mounting position, in order to move the attachment claw (14) aside and allow the retaining cleat to be inserted.

Once the retaining cleat has been inserted, the prestress in the torsion bar (15) locks the attachment claw (14) to the retaining cleat on the cycling shoe.

The twisting of the retaining cleat thus moves the attachment claw (14) aside, causing an opposing torsion about the axis (T), in order to release the cycling shoe.

The invention described with reference to two particular embodiments is not in any way restricted to these but by contrast covers any modification in shape and any alternative form of embodiment that fall within the scope of the attached claims, the essential feature being that the elastic means that allows mobility and that provides the retaining force of the attachment arrangement should comprise an element that is torsionally stressed.

The torsionally stressed element is preferably made of an elastic material such as steel, an elastomer, a plastic, a fiber-reinforced plastic or the like, so as to make use of the inherent elasticity of the constituent material and allow torsion about a torsion axis (T).

According to an alternative form that has not been depicted, the clipless pedal device has an attachment arrangement fixed under the sole of the cycling shoe, said attachment arrangement comprising at least one moving part that is prestressed into the attachment position by the elastic means which comprises the torsionally stressed element.

The invention claimed is:

1. A clipless pedal device for securing a pedal to a sole of a cycling shoe, the clipless pedal device comprising:
a first attachment piece comprising a first catching part at a first side of the pedal and that is prestressed into an attachment position by an elastic means,
wherein the elastic means comprises a single straight part spaced from said first catching part, said single straight part constituting a torsionally stressed element, and
wherein the first attachment piece is S-shaped, a middle part thereof constituting said torsionally stressed element.

2. The clipless pedal device as claimed in claim 1, the first attachment piece further comprising a second catching part that is secured at a second side of the pedal opposite said first side and that is prestressed into the attachment position by said torsionally stressed element of said elastic means.

3. The clipless pedal device as claimed in claim 2, further comprising a second attachment piece that is spaced from said first attachment piece and arranged so that the first catching part of the first attachment piece and a corresponding second catching part of the second attachment piece engage the cycling shoe therebetween.

4. The clipless pedal device as claimed in claim 1, wherein a distal end of the S-shaped first attachment piece comprises a turned-back end forming a pivot.

5. The clipless pedal device as claimed in claim 1, wherein the elastic means is made of wire.

6. The clipless pedal device as claimed in claim 1, further comprising a lateral deflector that presses said first attachment piece against the pedal.

7. The clipless pedal device as claimed in claim 1, further comprising a bearing plate mounted on the pedal.

8. A clipless pedal device for securing a pedal to a sole of a cycling shoe, the clipless pedal device comprising:
a first shoe-attachment piece comprising an S-shaped wire with a first catching part at a first side of the pedal, a second catching part at a second side of the pedal opposite the first side, and a first straight torsionally stressed elastic element between the first and second catching parts that is arranged to elastically urge the first and second catching parts to a shoe-attachment position;

a second shoe-attachment piece comprising an S-shaped wire with a third catching part at the first side of the pedal, a fourth catching part at the second side of the pedal, and a second straight torsionally stressed elastic element between the third and fourth second catching parts that is arranged to elastically urge the third and fourth catching parts to the shoe-attachment position, wherein the first and second straight torsionally stressed elastic elements are arranged to twist to permit selective attachment of a cycling shoe between the first and third catching parts or between the second and fourth catching parts; and two deflector mounts that respectively that are arranged to hold the first and second shoe-attachment pieces on the pedal.

9. The clipless pedal device of claim 8, wherein each of the first and second shoe-attachment pieces comprises ends that are turned inward between the respective said catching parts and straight torsionally stressed elastic elements, and wherein the ends are held by respective said deflector mounts and arranged to turn to form pivots.

\* \* \* \* \*